United States Patent
Takenaka

(10) Patent No.: US 6,822,777 B2
(45) Date of Patent: Nov. 23, 2004

(54) SEMI-TRANSPARENT REFLECTIVE ELECTRO-OPTIC APPARATUS AND ELECTRONIC EQUIPMENT USING THE SAME

(75) Inventor: Satoshi Takenaka, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/608,479

(22) Filed: Jun. 30, 2003

(65) Prior Publication Data
US 2004/0032678 A1 Feb. 19, 2004

(30) Foreign Application Priority Data
Jul. 11, 2002 (JP) .................................... 2002-203006

(51) Int. Cl.$^7$ .............................. G02F 1/03; G02F 1/07; G02F 1/1335; G02B 26/00
(52) U.S. Cl. .................. 359/245; 359/292; 349/113
(58) Field of Search ........................ 359/245, 290–292, 359/295, 298, 318; 385/901, 14, 40; 349/113

(56) References Cited

U.S. PATENT DOCUMENTS

2003/0142253 A1 * 7/2003 Takenaka .................... 349/113

FOREIGN PATENT DOCUMENTS

JP    A 10-319422    12/1998

* cited by examiner

Primary Examiner—Hung Xuan Dang
Assistant Examiner—Joseph Martinez
(74) Attorney, Agent, or Firm—Oliff & Berridge, PLC

(57) ABSTRACT

The invention provides a semi-transparent reflective electro-optic apparatus capable of increasing a quantity of display light in either of the reflection mode and the transparent mode, and electronic equipment including the same. In a TFT array substrate of a reflective electro-optic apparatus, the back surface of a light-reflecting film includes a light-guiding reflection surface that reflects and guides light incident from the back surface side of a light-transmitting substrate to the surface of the light-reflecting film opposing the light-guiding reflection surface with a light-transmitting window in between. Hence, of the light incident from the back surface side of the light-transmitting substrate, light that is shielded in the related art by the light-reflecting film and does not contribute to display in the transparent mode is partly reflected on the light-guiding reflection surface and thereby contributes to display.

11 Claims, 11 Drawing Sheets

[FIG. 1]
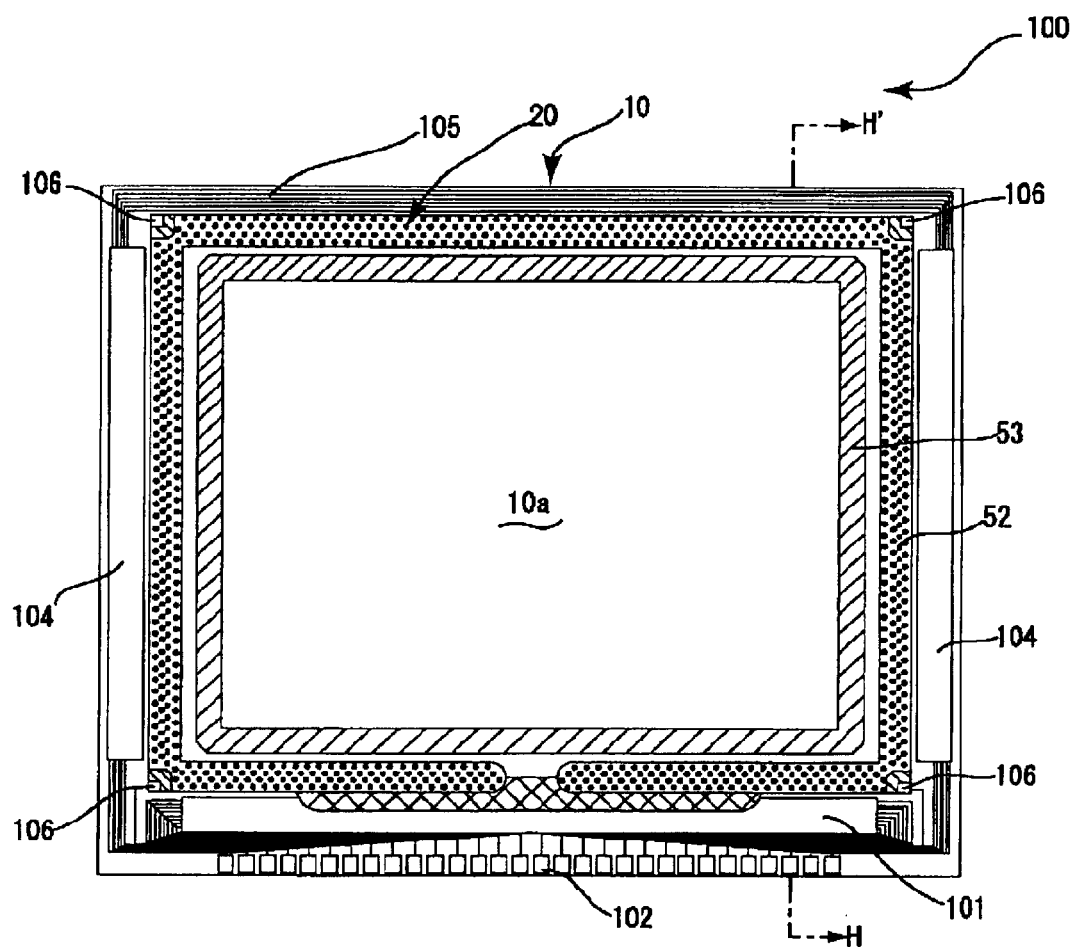
[FIG. 2]
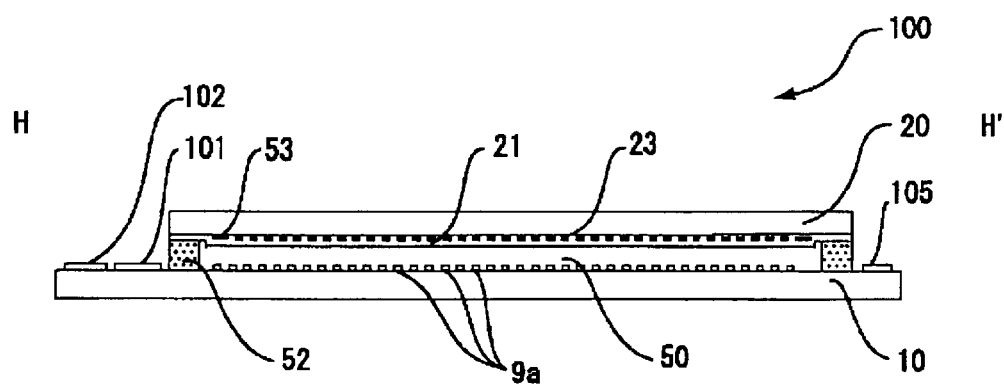

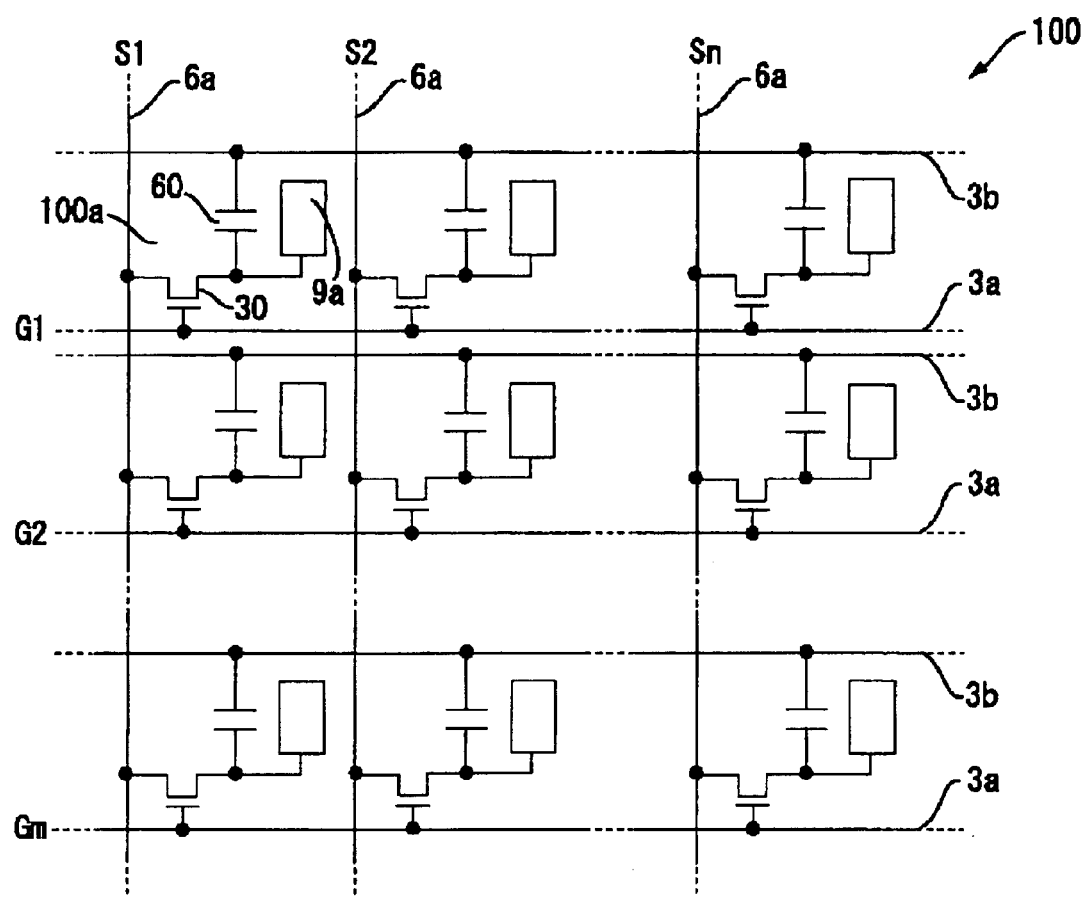
[FIG. 3]

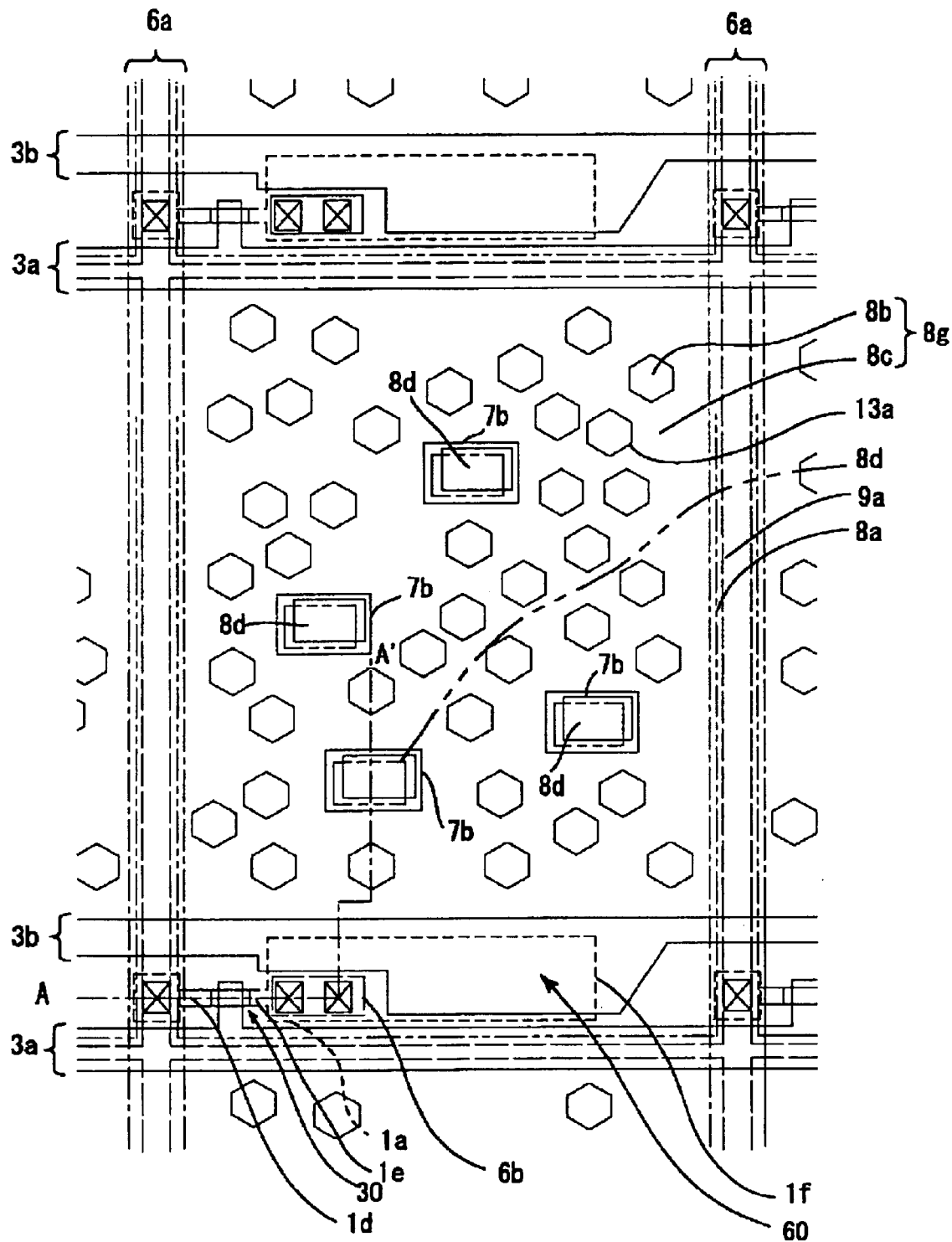
[FIG. 4]

[FIG. 5]
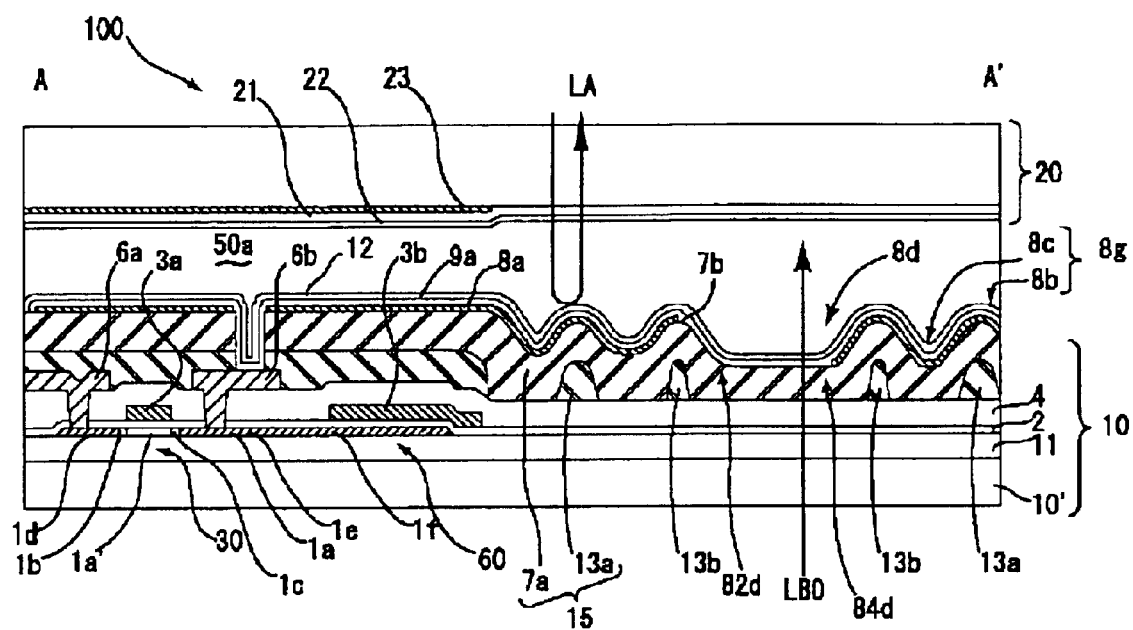

[FIG. 6]
(A)
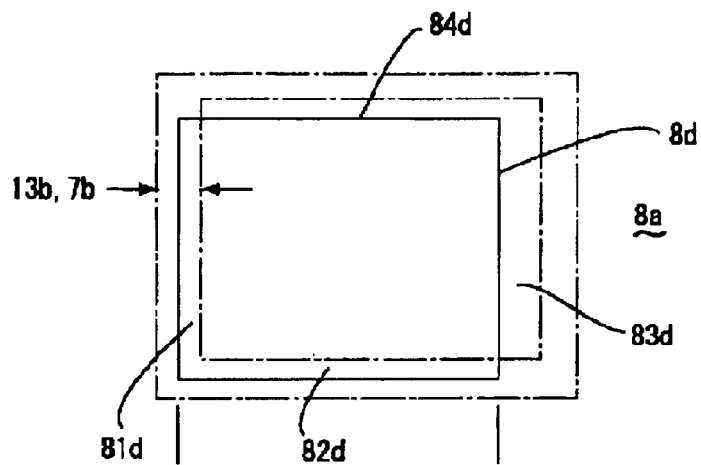
(B)
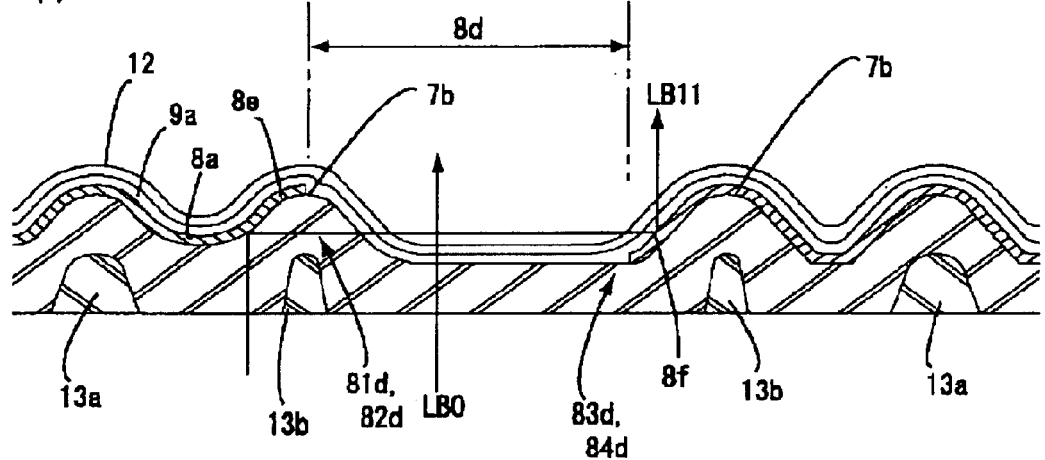

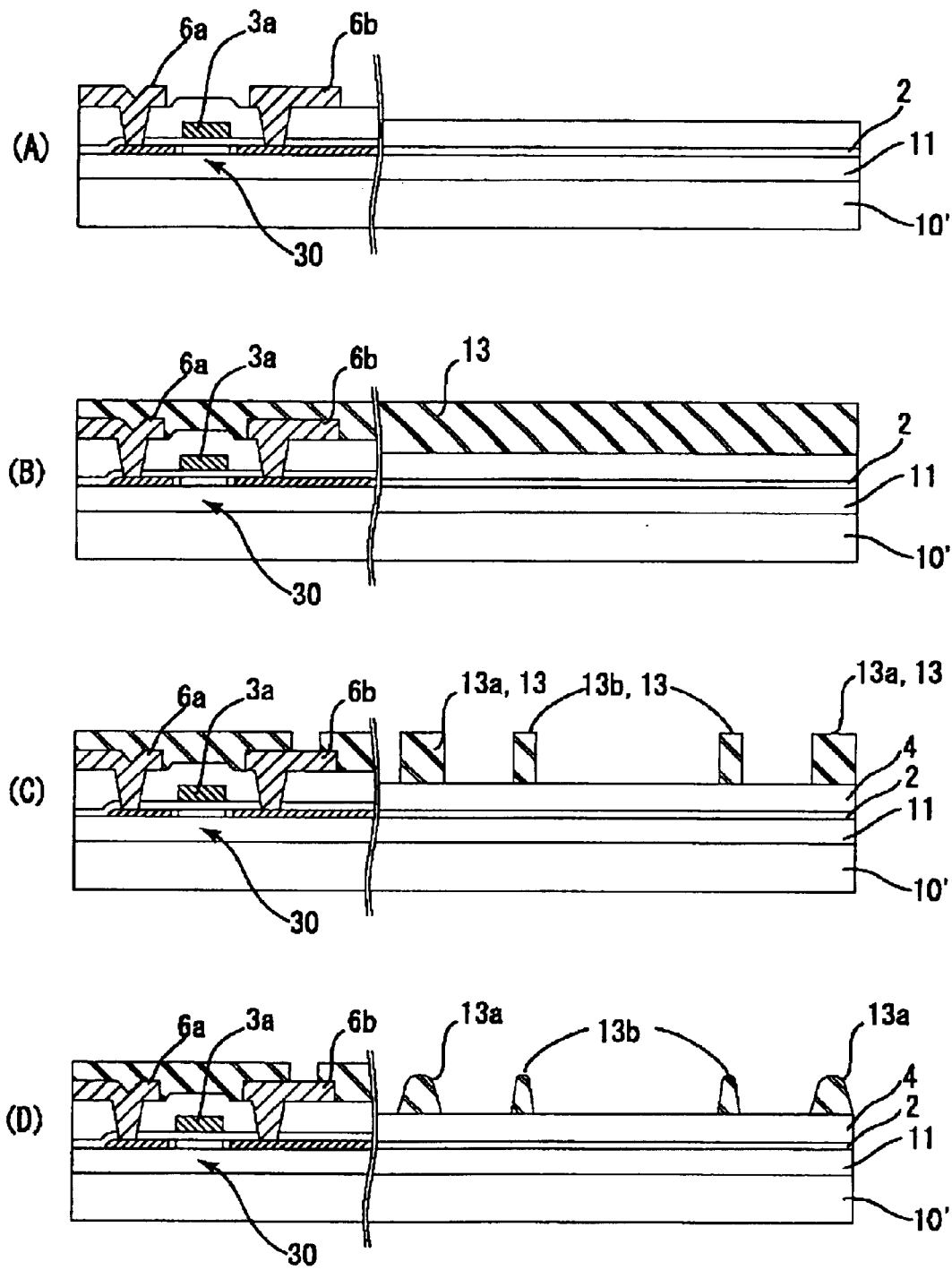
[FIG. 7]

[FIG. 8]
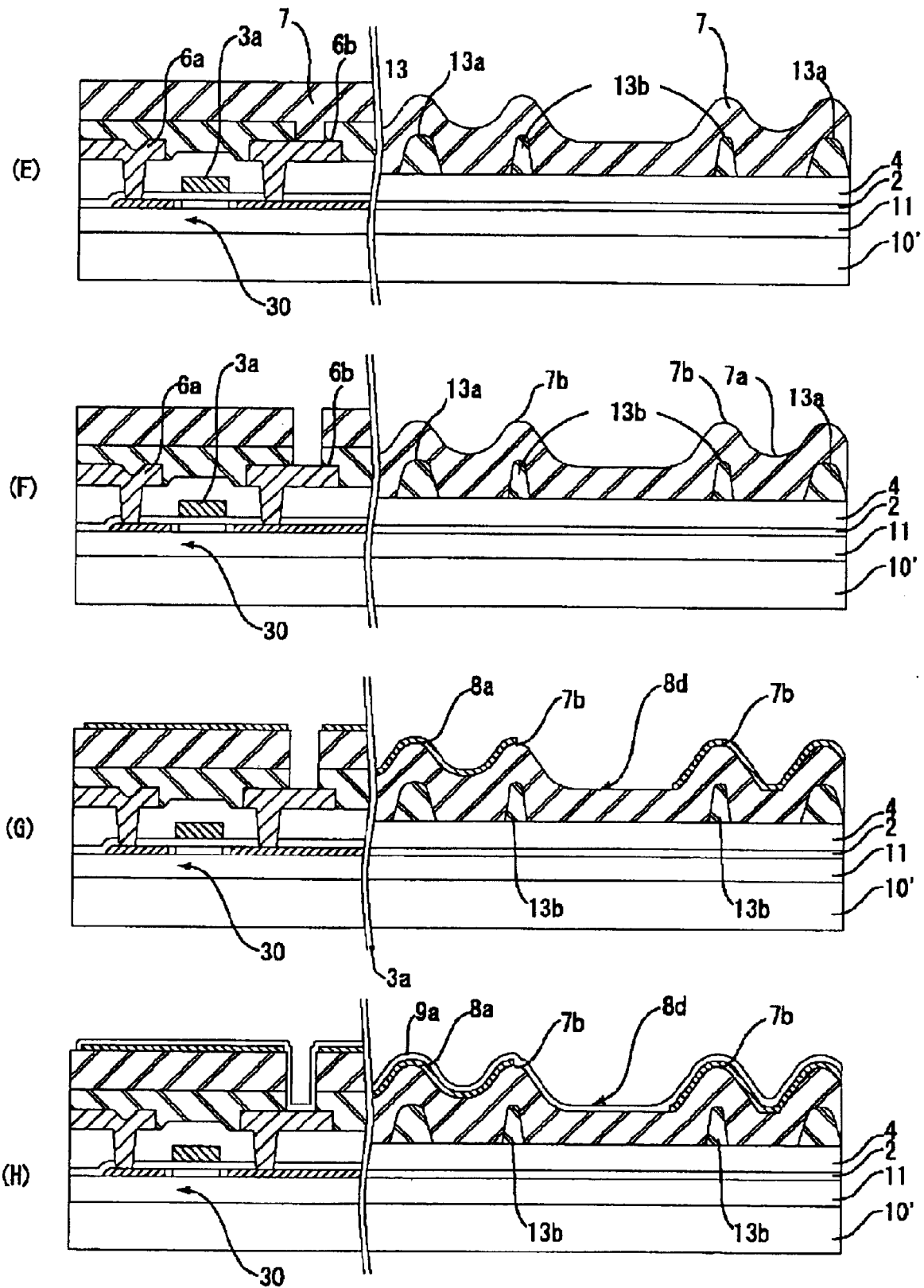

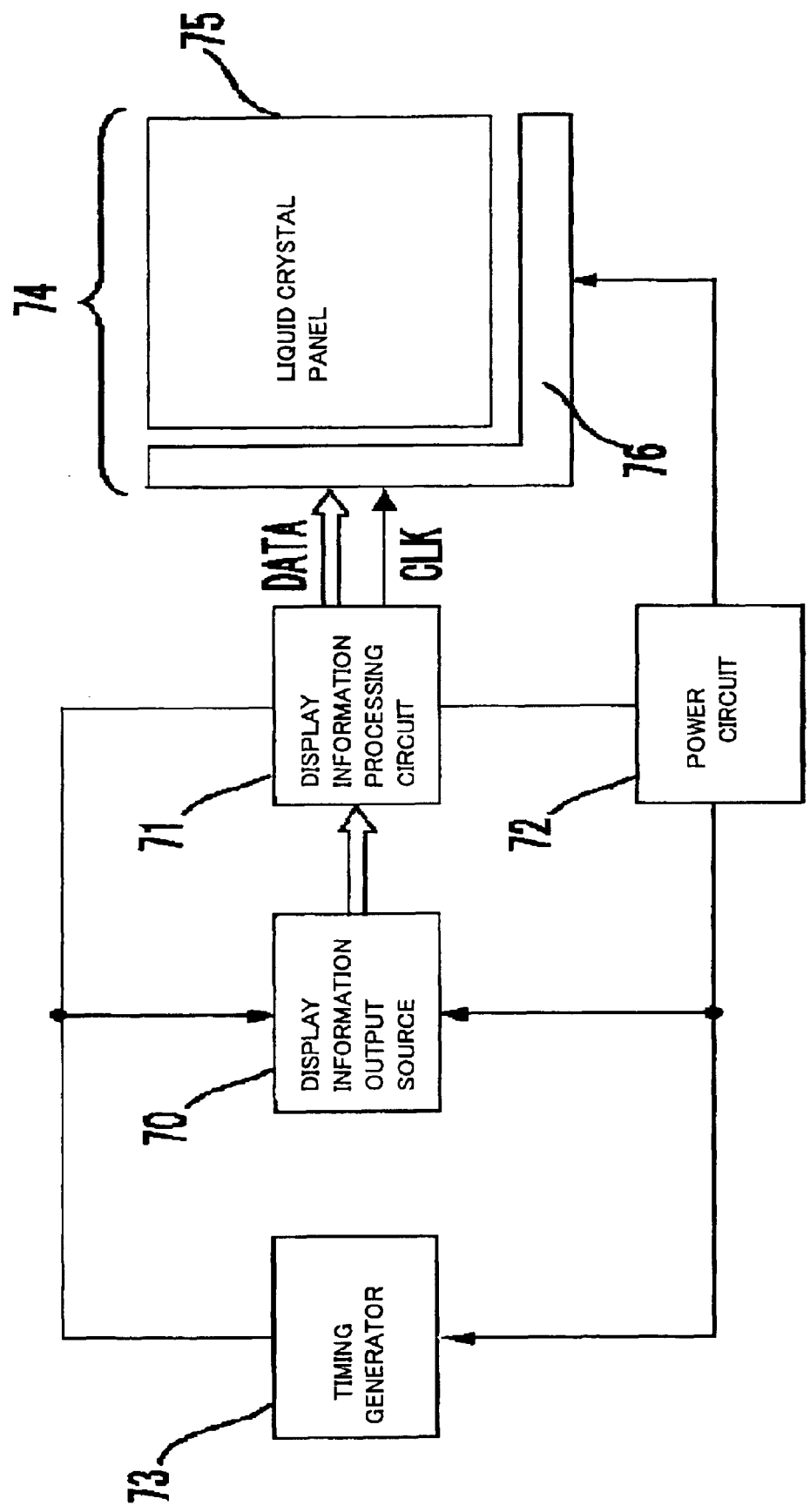
[FIG. 9]

[FIG. 10]
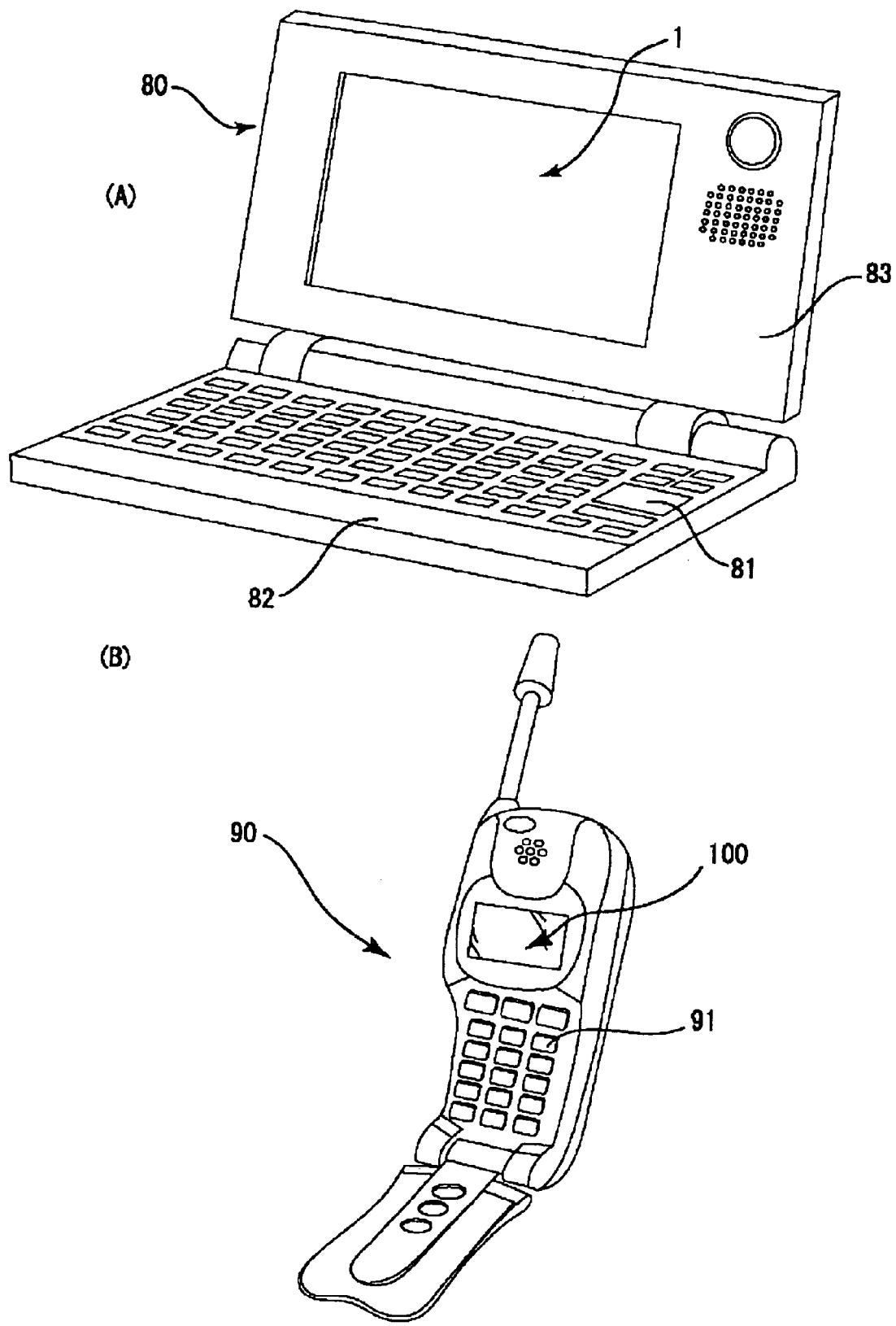

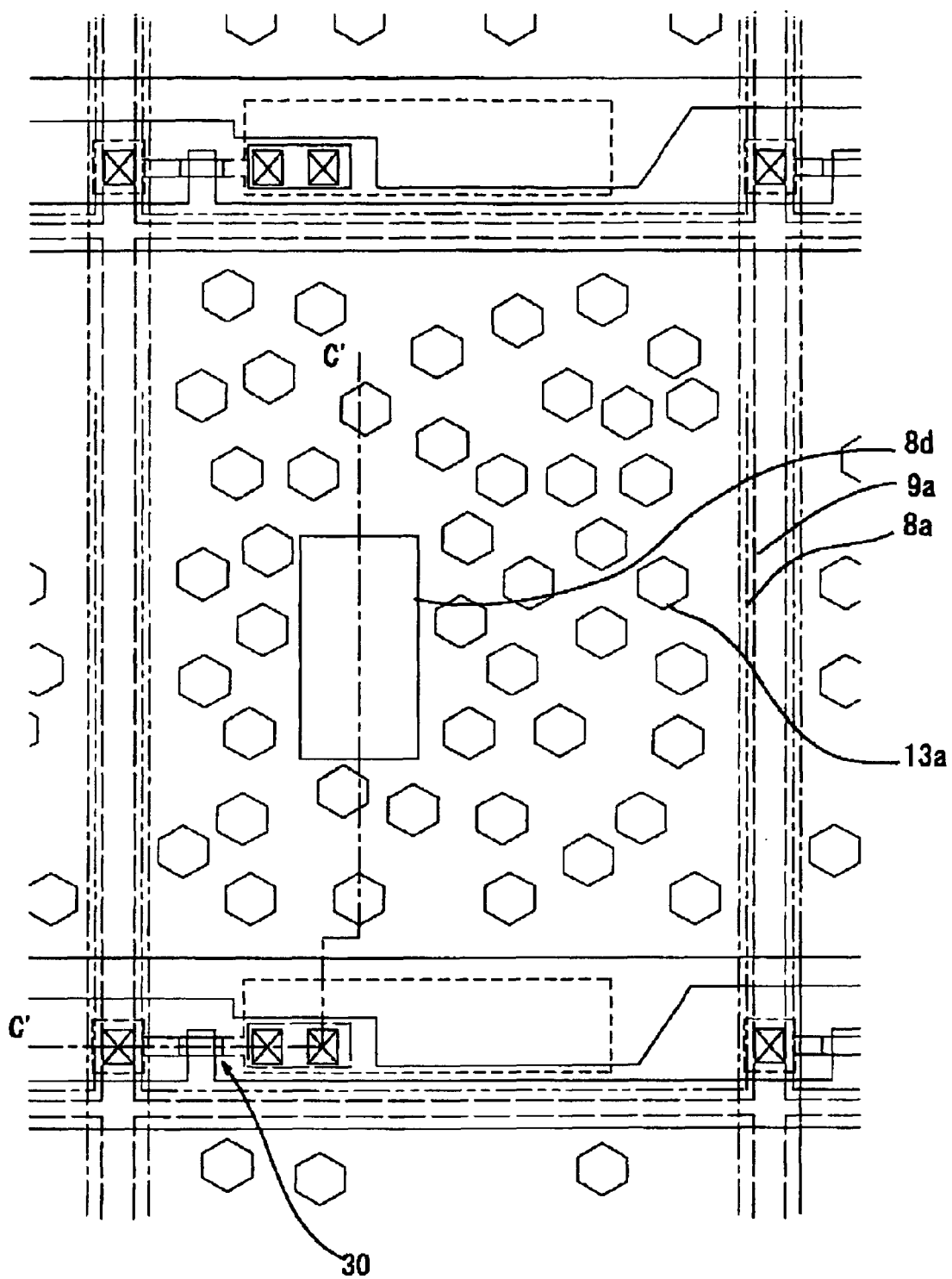
[FIG. 11]

[FIG. 1 2]
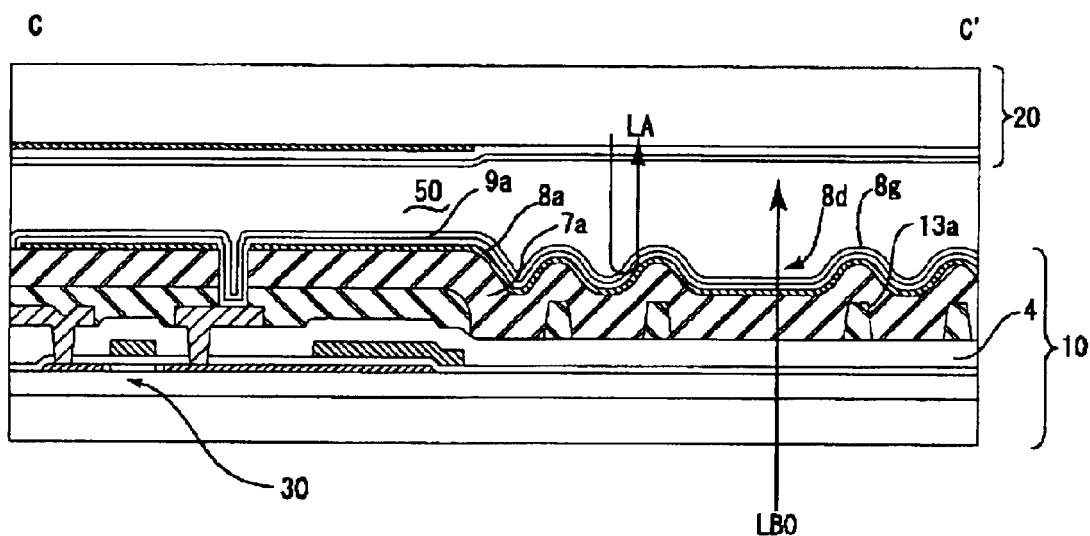
[FIG. 1 3]
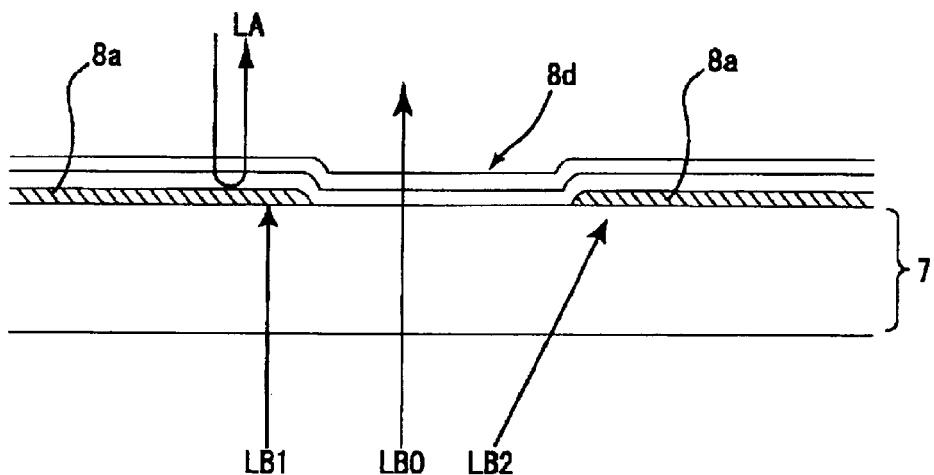

SEMI-TRANSPARENT REFLECTIVE ELECTRO-OPTIC APPARATUS AND ELECTRONIC EQUIPMENT USING THE SAME

BACKGROUND OF THE INVENTION

1. Field of Invention

The present invention relates to a semi-transparent reflective electro-optic apparatus, electronic equipment using the same, and a method of manufacturing the semi-transparent reflective electro-optic apparatus. More particularly, the invention relates to an arrangement of pixels in the semi-transparent reflective electro-optic apparatus.

2. Description of Related Art

The related art includes an electro-optic apparatus, such as a liquid crystal apparatus, which is usable as a direct-view-type display for various types of equipment. Of all the types of electro-optic apparatus, for example, in an active matrix liquid crystal apparatus using a TFT as a non-linear pixel-switching element, as shown in FIG. 11 and FIG. 12, a TFT array substrate 10 and a counter substrate 20 sandwich liquid crystals 50 used as an electro-optic material. The TFT array substrate 10 is provided with a pixel-switching TFT (Thin Film Transistor) 30, and a pixel electrode 9a composed of a transparent conductive film, such as an ITO film, and electrically connected to the TFT 30.

In the case of a reflective liquid crystal apparatus, a light-reflecting film 8a, which is used to reflect outside light incident from the counter substrate 20 side toward the counter substrate 20, is formed on the lower layer side of the light-transmitting pixel electrode 9a, so that, as indicated by an arrow LA of FIG. 12, light incident from the counter substrate 20 side is reflected on the TFT array substrate 10 side, and an image is displayed with light coming out from the counter substrate 20 side (reflection mode).

In the reflective liquid crystal apparatus, however, when light reflected on the light-reflecting film 8a has strong light directionality, the dependency on a viewing angle, such as an event that the brightness differs with an angle at which an image is viewed, becomes noticeable. Hence, when a liquid crystal apparatus is fabricated, photosensitive resin, such as acrylic resin, is applied on the surface of an interlayer insulation film 4 or a surface protection film (not shown) formed on the surface thereof, in a thickness of 800 nm to 1500 nm, and a lower layer light-transmitting film 13a of a specific pattern made of the photosensitive resin layer is selectively left through the use of the photolithographic technique, so that a concavo-convex pattern 8g is provided to the surface of the light-reflecting film 8a. If no further treatment is applied, the edge of the lower layer light-transmitting film 13a appears directly on the concavo-convex pattern 8g. Hence, another layer, that is, an upper layer light-transmitting film 7a made of a photosensitive resin layer with high fluidity, is applied and formed atop the lower layer light-transmitting film 13a. The concavo-convex pattern 8g of an edgeless and smooth shape can be thus provided to the surface of the light-reflecting film 8a. For instance, such a concavo-convex pattern is disclosed in JP-A-10-319422.

Of the reflective types of liquid crystal apparatus, in the case of a semi-transparent reflective liquid crystal apparatus capable of display in the transparent mode as well, the light-reflecting film 8a is provided with a light-transmitting window 8d in a region overlapping the pixel electrode 9a on a plane. The region corresponding to the light-transmitting window 8d is of a flat plane, because either the lower layer light-transmitting film 13a is formed across the entire surface or the lower layer light-transmitting film 13a is not formed at all in the region.

In the semi-transparent reflective liquid crystal apparatus arranged in this manner, a backlight device (not shown) is placed on the TFT array substrate 10 side. By allowing light emitted from the backlight device to be incident from the TFT array substrate 10 side, light heading to the light-reflecting film 8a does not contribute to display as it is shielded by the light-reflecting film 8a as indicated by arrows LB1 and LB2 of FIG. 13. However, as indicated by an arrow LB0 of FIG. 12 and FIG. 13, light heading to the light-transmitting window 8d where no light-reflecting film 8a is formed passes through the light-transmitting window 8d toward the counter substrate 20, and thereby contributes to display (transparent mode).

Japanese Patent Application No. 2001-377304 discloses a liquid crystal apparatus arranged in this manner.

SUMMARY OF THE INVENTION

With the related art semi-transparent reflective liquid crystal apparatus, however, a quantity of display light in the reflection mode and a quantity of display light in the transparent mode are defined totally by the areas of the light-reflecting film 8a and the light-transmitting window 8d. Hence, there is a problem that when the brightness of display is increased in one mode, the brightness of display in the other mode is sacrificed, and the brightness of display cannot be increased in the both modes.

The invention addresses the above and/or other problems, and provides a semi-transparent reflective electro-optic apparatus capable of increasing a quantity of display light in either of the reflection mode and the transparent mode, and electronic equipment including the same.

In order to address or achieve the above, according to the invention, a semi-transparent reflective electro-optic apparatus is provided including, on a light-transmitting substrate retaining an electro-optic material, a light-transmitting concave and convex forming film which defines specific concave portions and convex portions, and a light-reflecting film formed over the concave and convex forming film, with a light-transmitting window being formed in the light-reflecting film. A back surface of the light-reflecting film includes, in a partial region of a periphery of the light-transmitting window, a light-guiding reflection surface that opposes a surface of the light-reflecting film in a region opposing the partial region with the light-transmitting window in between, so that part of light incident from a back surface side of the light-transmitting substrate is reflected on the light-guiding reflection surface and guided to a surface side of the light-transmitting substrate.

With the semi-transparent reflective electro-optic apparatus to which the invention is applied, display in the reflection mode is possible because the light-reflecting film is formed, and display in the transparent mode is also possible because the light-transmitting window is formed in the light-reflecting film. The back surface of the light-reflecting film includes the light-guiding reflection surface that reflects and guides light incident from the back surface side of the light-transmitting substrate to the surface of the light-reflecting film opposing the light-guiding reflection surface with the light-transmitting window in between. Hence, of the light incident from the back surface side of the light-transmitting substrate on, light that is shielded in the related art by the light-reflecting film and does not contribute to display in the transparent mode is partly reflected on the light-guiding reflection surface and guided to the surface of the light-reflecting film, and thereby contributes to display in the invention. For this reason, a quantity of display light in the transparent mode can be increased without enlarging the area of the light-transmitting window. It is thus possible to enhance the brightness of display in the transparent mode without sacrificing the brightness of display in the reflection mode.

According to the invention, it is preferable that the concave and convex forming film is composed of a lower layer light-transmitting film formed into a specific pattern, and an upper layer light-transmitting film formed on an upper layer side of the lower layer light-transmitting film. When arranged in this manner, even when the lower layer light-transmitting film has edges, the upper layer light-transmitting film eliminates the edges. It is thus possible to form concave portions and convex portions of an edgeless and smooth shape on the surface of the light-reflecting film.

According to the invention, when the light-guiding reflection surface is formed on the back surface of the light-reflecting film, for example, a frame-shaped protrusion forming a frame-shaped convex portion along an outer rim of the light-transmitting window with respect to a surface of the concave and convex forming film is formed on a lower layer side of the light-reflecting film, and the light-guiding reflection surface is formed of a back surface of the light-reflecting film covering the frame-shaped convex portion from a foot portion to a top portion on a side opposite to a side where the light-transmitting window is formed. Also, a surface of the light-reflecting film opposes the light-guiding reflection surface and forms a reflection surface to which light reflected on the light-guiding reflection surface is guided, by covering the frame-shaped convex portion with the light-reflecting film from a foot portion to a top portion on a side where the light-transmitting window is formed, at a portion opposing the light-guiding reflection surface with the light-transmitting window in between.

According to the invention, it is preferable that the reflection surface for light reflected on the light-guiding reflection surface opposes the light-guiding reflection surface as a parallel or nearly parallel plane.

According to the invention, it is preferable that the frame-shaped protrusion is composed of a light-transmitting film formed in a same layer as the lower layer light-transmitting film.

In this case, it is preferable that the frame-shaped protrusion and the lower layer light-transmitting film are formed with rounded top surface portions. When arranged in this manner, a light scattering property on the surface of the light-reflecting film can be enhanced. Meanwhile, a portion functioning as the light-guiding reflection surface on the back surface of the light-reflecting film, and the surface portion of the light-reflecting film to which light is guided from the light-guiding reflection surface need to shape slopes. By providing roundness to the top surface of the frame-shaped protrusion, the area of a flat portion that cannot be utilized as the light-guiding reflection surface can be diminished on the back and main surfaces of the light-reflecting film formed on the main surface side of the frame-shaped protrusion, which makes it possible to broaden the portion functioning as the light-guiding reflection surface on the back surface of the light-reflecting film and the surface portion of the light-reflecting film to which light is guided from the light-guiding reflection surface. Accordingly, a light utilization factor in the transparent mode can be enhanced. The phrase "with the rounded top surface portions" means any shape including a shape such that the entire top surface is made of a curved surface like a hanging bell and a shape such that part of the top surface is left as a flat plane like a bowl, as long as a portion corresponding to the boundary between the top surface portion and the side surface has a curved surface.

According to the invention, it is preferable that the light-reflecting film has a film thickness less than a height of the frame-shaped convex portion. When arranged in this manner, a portion opposing the light-guiding reflection surface via the light-transmitting window can be positioned lower when viewed from the light-guiding reflection surface of the light-reflecting film.

According to the invention, it is preferable that the light-reflecting film is provided with more than one light-transmitting window. When arranged in this manner, under a condition that the area of the light-transmitting window is same, then the light-guiding reflection surfaces can be formed extensively in a case where plurality of small light-transmitting windows are formed in comparison with a case where a single large light-transmitting window is formed. Hence, a light utilization factor in the transparent mode can be enhanced.

According to the invention, a planar shape of the light-transmitting window is, for example, a polygonal having a side parallel or nearly parallel to a side on which the light-guiding reflection surface is formed. When arranged in this manner, because the light-guiding reflection surface and a portion opposing the light-guiding reflection surface through the light-transmitting window of the light reflecting film can be formed efficiently, a light utilization factor in the transparent mode can be enhanced.

According to the invention, the electro-optic material is, for example, a liquid crystal.

The electro-optic apparatus to which the invention is applied can be used as a display apparatus of electronic equipment, such as a mobile computer and a cellular phone.

BRIEF DESCRIPTION OF THE DRAWINGS

FIG. 1 is a plan view of an electro-optic apparatus to which the invention is applied when viewed from a counter substrate side;

FIG. 2 is a cross-sectional view taken along plane H-H' of FIG. 1;

FIG. 3 is a schematic of an equivalent circuit of elements formed in a matrix of plural pixels in the electro-optic apparatus;

FIG. 4 is a plan view showing an arrangement of each pixel on a TFT array substrate of the electro-optic apparatus according to the invention;

FIG. 5 is a cross-sectional view of the electro-optic apparatus according to the invention taken along plane A-A' of FIG. 4;

FIGS. 6(A) and 6(B) are respectively a plan view and a cross-sectional view showing the periphery of a light-transmitting window in the TFT array substrate of the electro-optic apparatus according to the invention;

FIGS. 7(A) through 7(D) are cross-sectional views showing a fabrication sequence of the TFT array substrate according to the invention;

FIGS. 8(E) through 8(H) are cross-sectional views showing the fabrication sequence of the TFT array substrate according to the invention;

FIG. 9 is a schematic showing an arrangement of a circuit of electronic equipment using the electro-optic apparatus according to the invention as a display apparatus;

FIGS. 10(A) and 10(B) are a schematic showing a mobile personal computer, and a schematic showing a cellular phone, respectively, both using the electro-optic apparatus according to the invention;

FIG. 11 is a plan view showing an arrangement of respective pixels formed on a TFT array substrate of a related art electro-optic apparatus;

FIG. 12 is a cross-sectional view of the related art electro-optic apparatus;

FIG. 13 is a schematic showing a concavo-convex pattern and a light-transmitting window formed on/in the TFT array substrate of the related art electro-optic apparatus.

DETAILED DESCRIPTION OF PREFERRED EMBODIMENTS

Exemplary embodiments of the invention are described below with reference to the accompanying drawings.
(Basic Arrangement of Electro-Optic Apparatus)

FIG. 1 is a plan view of an electro-optic apparatus to which the invention is applied when viewed from a counter substrate side together with respective components. FIG. 2 is a cross-sectional view taken along plane H-H' of FIG. 1. FIG. 3 is a schematic of an equivalent circuit showing respective elements, wirings, etc., in a matrix of plural pixels within an image display region of the electro-optic apparatus. In order to illustrate the respective layers and members in a recognizable size in the drawings, the respective layers and members are on different scales in each drawing used to explain this exemplary embodiment.

Referring to FIG. 1 and FIG. 2, an electro-optic apparatus 100 of this exemplary embodiment includes a TFT array substrate 10 and a counter substrate 20 laminated to each other with a sealing member 52, and liquid crystals 50 used as an electro-optic material and sandwiched therebetween. A peripheral partition 53 made of a light-shielding material is formed in the inside region of a region where the sealing member 52 is formed. A data line driving circuit 101 and mount terminals 102 are formed on the outside region of the sealing member 52 along one side of the TFT array substrate 10, and scanning line driving circuits 104 are formed along two sides adjacent to this side. The remaining one side of the TFT array substrate 10 is provided with a plurality of wirings 105 used to connect the scanning line driving circuits 104 provided to either side of the image display region. Further, a pre-charge circuit or a check-up circuit may be provided optionally by utilizing a space below the peripheral partition 53. Also, a vertical conducting member 106 used to bring the TFT array substrate 10 and the counter substrate 20 into electrical conduction is formed in at least one corner of the counter substrate 20. In addition, the data line driving circuit 101, the scanning line driving circuits 104, etc. may overlap the sealing member 52 or formed in the inside region of the sealing member 52.

Instead of forming the data line driving circuit 101 and the scanning line driving circuits 104 on the TFT array substrate 10, for example, a TAB (Tape Automated Bonding) substrate on which is mounted a driving LSI may be connected electrically or mechanically to a group of terminals formed at the periphery portion of the TFT array substrate 10 via an anisotropic conductive film. In the electro-optic apparatus 100, although a polarizing film, a phase difference film, a polarizing plate, etc., are placed in their predetermined orientations depending on the kinds of the liquid crystals 50 to be used, that is, the operation modes, such as a TN (Twisted Nematic) mode and an STN (Super TN) mode, or a normally white mode/a normally black mode, an illustration of which is omitted herein. Also, in a case where the electro-optic apparatus 100 is used for color display, RGB color filters together with a protection film thereof are formed on the counter substrate 20 in a region opposing respective pixel electrodes (described below) on the TFT array substrate 10.

In an image display region 10a of the electro-optic apparatus 100 arranged in this manner, as shown in FIG. 3, a matrix of plural pixels 100a are formed, and a pixel electrode 9a and a pixel-switching TFT 30 to drive the pixel electrode 9a are formed in each of the pixels 100a. Data lines 6a to supply pixel signals S1, S2, . . . , and Sn are electrically connected to the sources of the TFTs 30. The pixel signals S1, S2, . . . , and Sn written into the data lines 6a may be supplied line-sequentially in this order, or may be supplied group by group for a plurality of neighboring data lines 6a. Also, scanning lines 3a are electrically connected to the gates of the TFTs 30, and it is arranged in such a manner that pulses of scanning signals G1, G2, . . . , and Gm are applied to the scanning lines 3a line-sequentially in this order at predetermined timings. The pixel electrodes 9a are electrically connected to the drains of the TFTs 30, and by keeping the TFTs 30, used as switching elements, switched ON for a certain period, the pixel signals S1, S2, . . . , and Sn supplied from the data lines 6a are written into the respective pixels at predetermined timings. The pixel signals S1, S2, . . . , and Sn at a predetermined level written into the liquid crystals via the pixel electrodes 9a in this manner are retained for a certain period between the pixel electrodes 9a and a counter electrode 21 on the counter substrate 20 shown in FIG. 2.

The liquid crystals 50 modulate light as the orientation or the order of the molecular association are changed by the applied voltage level, and thereby enable grayscale display. In the case of a normally white mode, a quantity of incident light passing through a portion of the liquid crystals 50 is reduced in response to an applied voltage, and in the case of a normally black mode, a quantity of incident light passing through a portion of the liquid crystals 50 is increased in response to an applied voltage. As a result, light with contrast corresponding to the pixel signals S1, S2, . . . , and Sn is emitted from the electro-optic apparatus 100 as a whole.

In order to reduce or prevent the retained pixel signals S1, S2, . . . , and Sn from leaking, a storage capacitor 60 may be additionally provided in parallel with a liquid crystal capacitor formed between the pixel electrode 9a and the counter electrode. For example, a voltage applied to the pixel electrode 9a is retained in the storage capacitor 60 three orders of magnitude longer than a time during which a source voltage is applied. This enhances the retention characteristic of charges and makes it possible to achieve the electro-optic apparatus 100 with a high contrast ratio. A method of forming the storage capacitor 60 may be either the case of forming the storage capacitor 60 between the pixel electrode 9a and a capacitor line 3b provided to form the storage capacitor 60 as shown in FIG. 3 by way of example, or the case of forming the storage capacitor 60 between the pixel electrode 9a and the scanning line 3a in the preceding stage.

(Arrangement of TFT Array Substrate)

FIG. 4 is a plan view showing a plurality of neighboring groups of pixels on the TFT array substrate employed in the electro-optic apparatus of this exemplary embodiment. FIG. 5 is a cross-sectional view showing part of the pixel in the electro-optic apparatus taken along plane A-A' of FIG. 4.

Referring to FIG. 4, a matrix of pixel electrodes 9a made of a plurality of transparent ITO (Indium Tin Oxide) films are formed on the TFT array substrate 10, and the pixel-switching TFT 30 is connected to each pixel electrode 9a. Also, the data lines 6a, the scanning lines 3a, and the capacitor lines 3b are formed along the transverse and longitudinal boundaries of the pixel electrode 9a, and the TFT 30 is connected to the data line 6a and the scanning line 3a. In other words, the data line 6a is electrically connected to a high-concentration source region 1d of the TFT 30 through a contact hole, and a protruding portion of the scanning line 3a forms the gate electrode of the TFT 30. The storage capacitor 60 is of a structure that uses an extended portion 1f of a semiconductor film 1, used to form the pixel-switching TFT 30 and given with electrical conductance, as a lower electrode, and the capacitor line 3b overlapping the lower electrode 41 as an upper electrode.

The cross section taken along plane A-A' of the pixel region arranged in this manner is shown in FIG. 5. An underlying protection film 11 made of a silicon oxide film (insulation film) having a thickness of 300 nm to 500 nm is formed on the surface of a light-transmitting substrate 10', which is the base substrate of the TFT array substrate 10, and an insular semiconductor film 1a having a thickness of 30 nm to 100 nm is formed on the surface of the underlying protection film 11. The semiconductor film 1a is a film obtained as follows: a semiconductor film made of an amorphous silicon film is deposited across the entire surface of the light-transmitting substrate 10' in a thickness of 30 nm to 100 nm through the plasma CVD method under the temperature condition that the substrate temperature is 150° C. to 450° C., and laser annealing is performed by irradiating a laser beam to the semiconductor film to melt the amorphous semiconductor film, after which the semiconductor film is cooled to solidify, thereby giving rise to crystallization.

A gate insulation film 2 made of a silicon oxide film having a thickness of approximately 50 to 150 nm is formed on the surface of the semiconductor film 1a formed in this manner, and the scanning line 3a having a thickness of 300 nm to 800 nm is formed on the surface of the gate insulation film 2. Of the entire semiconductor film 1a, a region opposing the scanning line 3a via the gate insulation film 2 forms a channel region 1a'. A source region having a low-concentration source region 1b and a high-concentration source region 1d is formed on one side of the channel region 1a', and a drain region having a low-concentration drain region 1c and a high-concentration drain region 1e is formed on the other side.

An interlayer insulation film 4 made of a silicon oxide film having a thickness of 300 nm to 800 nm is formed on the surface side of the pixel-switching TFT 30, and a surface protection film (not shown) made of a silicon nitride film having a thickness of 100 nm to 300 nm is optionally formed on the surface of the interlayer insulation film 4. The data line 6a having a thickness of 300 nm to 800 nm is formed on the surface of the interlayer insulation film 4, and the data line 6a is electrically connected to the high-concentration source region 1d through the contact hole made in the interlayer insulation film 4. A drain electrode 6b, which has been formed concurrently with the data line 6a, is present on the surface of the interlayer insulation film 4, and the drain electrode 6b is electrically connected to the high-concentration drain region 1e through a contact hole made in the interlayer insulation film 4.

A lower layer light-transmitting film 13a of a specific pattern made of photosensitive resin is formed atop the interlayer insulation film 4, and an upper layer light-transmitting film 7a made of photosensitive resin is formed on the surface of the lower layer light-transmitting film 13a. Also, a light-reflecting film 8a made of an aluminum film or the like is formed on the surface of the upper layer light-transmitting film 7a. Hence, concave portions and convex portions formed on the surface of a concave and convex forming film 15 composed of the lower layer light-transmitting film 13a and the upper layer light-transmitting film 7a are reflected on the surface of the light-reflecting film 8a as a concavo-convex pattern 8g.

Further, the pixel electrode 9a made of an ITO film is formed atop the light-reflecting film 8a. The pixel electrode 9a is directly deposited on the surface of the light-reflecting film 8a, and the pixel electrode 9a and the light-reflecting film 8a are electrically connected to each other. The pixel electrode 9a is also electrically connected to the drain electrode 6b through a contact hole made in the photosensitive resin layer 7a and the interlayer insulation film 4.

An alignment film 12 made of a polyimide film is formed on the surface side of the pixel electrode 9a. The alignment film 12 is a film obtained by applying rubbing treatment to a polyimide film.

The storage capacitor 60 is formed for the extended portion 1f (lower electrode) from the high-concentration drain region 1e by forming the capacitor line 3b to oppose the extended portion 1f as the upper electrode via an insulation film (dielectric film) that has been formed concurrently with the gate insulation film 2.

The TFT 30 is preferably of the LDD structure as described above. However, it may be of an offset structure which omits implantation of impurity ions into regions corresponding to the low-concentration source region 1b and the low-concentration drain region 1c. Alternatively, the TFT 30 may be of a TFT of a self-alignment type, in which high-concentration source and drain regions are formed in a self-aligning manner by implanting impurity ions at a high concentration using the gate electrode (part of the scanning line 3a) as a mask.

In this exemplary embodiment, a single gate structure is adopted, in which the TFT 30 includes a single gate electrode (scanning line 3a) placed in the source-drain region. However, two or more gate electrodes may be placed in this region. In this case, it is arranged in such a manner that the same signal is applied to each gate electrode. By forming the TFT 30 with a dual gate (double gate) or a triple or more gate in this manner, a leaking current at the junction between the channel and the source-drain region can be reduced or prevented, which in turn makes it possible to reduce an OFF current. By forming at least one gate electrode in the LDD structure or the offset structure, an OFF current can be reduced further, and a stable switching element can be thereby obtained.

(Arrangements of Concavo-Concave Pattern and Periphery of Light-Transmitting Window)

FIGS. 6(A) and 6(B) are respectively a plan view and a cross-sectional view showing the periphery of the light-transmitting window of the TFT array substrate in the electro-optic apparatus according to the invention.

As has been explained with reference to FIG. 5, the concavo-convex pattern 8g having convex portions 8b and concave portions 8c is formed on the surface of the light-reflecting film 8a on the TFT array substrate 10. In this exemplary embodiment, as shown in FIG. 4, the convex portion 8b and the lower layer light-transmitting film 13a forming the same have circular planar shapes. However, the planar shapes of the convex portion 8b and the lower layer light-transmitting film 13a are not limited to a circular shape, and various shapes including an elliptical shape and a polygonal shape, such as a hexagonal shape and a square shape, can be adopted.

In order to form such a concavo-convex pattern 8g, in the TFT array substrate 10 of this exemplary embodiment, as shown in FIG. 5, the lower layer light-transmitting film 13a of a specific pattern made of light-transmitting photosensitive resin is left selectively on the lower layer side of the light-reflecting film 8a in regions corresponding to the convex portions 8b of the concavo-convex pattern 8g, so that the concavo-convex pattern 8g is given to the surface of the light-reflecting film 8a formed on the upper layer side thereof.

Also, in this exemplary embodiment, another layer, that is, the upper layer light-transmitting film 7a made of second light-transmitting photosensitive resin with high fluidity (second light-transmitting material), is applied and formed atop the lower layer light-transmitting film 13a, so that the concavo-convex pattern 8g of a smooth shape is given to the surface of the light-reflecting film 8a.

Further, in this exemplary embodiment, a plurality of rectangular light-transmitting windows 8d are formed in the light-reflecting film 8a in the regions overlapping the pixel electrodes 9a on a plane. Hence, the pixel electrode 9a made of ITO is present, but the light-reflecting film 8a is absent in a portion corresponding to the light-transmitting window 8d.

In this exemplary embodiment, as shown in FIG. 5 and FIGS. 6(A) and 6(B), a frame-shaped protrusion 13b that forms a frame-shaped convex portion 7b along the outer rim of each of the plurality of light-transmitting windows 8a with respect to the surface of the upper layer light-transmitting film 7a is further formed on the lower layer side of the light-reflecting film 8a. The frame-shaped protrusion 13b is a film formed concurrently with the lower layer light-transmitting film 13a, and as with the lower layer light-transmitting film 13a, it has a round top surface portion.

Herein, in a region corresponding to two sides 81d and 82d of the light-transmitting window 8d, the light-reflecting film 8a is formed so as to cover the frame-shaped convex portion 7b from a foot portion to a top portion on the side opposite to the side where the light-transmitting window 8d is formed, whereas no light-transmitting film 8a is formed on the frame-shaped convex portion 7b on the side where the light-transmitting window 8d is formed. By contrast, in a region corresponding to the other two sides 83d and 84d of the light-transmitting window 8d, the light-reflecting film 8a is formed so as to cover the frame-shaped convex portion 7b from a foot portion to a top portion on a side where the light-transmitting window 8d is formed. Also, the light-reflecting film 8a has a film thickness appreciably less than the height of the frame-shaped convex portion 7b.

Hence, by covering the frame-shaped convex portion 7b with the light-reflecting film 8a from the foot portion to the top portion on the side opposite to the side where the light-transmitting window 8d is formed in the region corresponding to the two sides 81d and 82d of the light-transmitting window 8d, a light-guiding reflection surface 8e, which, as indicated by an arrow L11 of FIG. 6(B), reflects and guides light incident from the back surface side of the light-transmitting substrate 10' to the surface of the light-reflecting film 8a opposing the light-guiding reflection surface 8e with the light-transmitting window 8a in between, is formed on the back surface of the light-reflecting film 8a. In contrast, by covering the frame-shaped portion 7b with the light-reflecting film 8a from the foot portion to the top portion on the side where the light-transmitting window 8d is formed in the region corresponding to the other two sides 83d and 84d of the light-transmitting window 8d, a reflection surface, which reflects light reflected on the light-guiding reflection surface 8e toward the counter substrate 20 side, is formed on the surface of the light-reflecting film 8a. Herein, the light-guiding reflection surface 8e and the reflection surface 8f for light reflected on the light-guiding reflection surface 8e oppose each other as parallel or nearly parallel planes.

The convex portion 8b and the lower light-transmitting film 13a forming the same may be formed in the inside region of the light-transmitting window 8d.

(Arrangement of Counter Substrate)

Referring to FIG. 5 again, a light-shielding film 23 referred to as a black matrix or a black stripe is formed on the counter substrate 20 in a region opposing the transverse and longitudinal boundaries of the pixel electrode 9a formed on the TFT array substrate 10, on the upper layer side of which is formed the counter electrode 21 made of an ITO film. Also, an alignment film 22 made of a polyimide film is formed on the upper layer side of the counter electrode 21, and the alignment film 22 is a film obtained by applying rubbing treatment to a polyimide film.

(Function and Advantage of Exemplary Embodiment)

With the semi-transparent reflective electro-optic apparatus 100 arranged in this manner, the light-reflecting film 8a is formed on the lower layer side of the pixel electrode 9a, and therefore, light incident from the counter substrate 20 side is reflected on the TFT array substrate 10 side as indicated by an arrow LA of FIG. 5, and an image is displayed with light coming out from the counter substrate 20 side (reflection mode).

Also, of the light emitted from a backlight device (not shown) placed on the back surface side of the TFT array substrate 10, light heading to the light-transmitting window 8d where no light-reflecting film 8a is formed passes through the light-transmitting window 8d to the counter substrate 20 side as indicated by an arrow LB0, and contributes to display (transparent mode).

Also, in this exemplary embodiment, the back surface of the light-reflecting film 8a includes the light-guiding reflection surface 8f that reflects and guides light incident from the back surface side of the light-transmitting substrate 10' to the surface (reflection surface 8f) of the light-reflecting film 8a opposing the light-guiding reflection surface 8e with the light-transmitting window 8d in between. For this reason, of the light incident from the back surface side of the light-transmitting substrate 10', light that is shielded in the related art by the light-reflecting film 8a and does not contribute to display in the transparent mode is partly reflected on the light-guiding reflection surface 8e and guided to the reflection surface 8f on the surface side of the light-reflecting film 8a as indicated by an arrow LB11 of FIG. 6(B), and thereby contributes to display in this exemplary embodiment. Hence, a quantity of display light in the transparent mode can be increased without enlarging the area of the light-transmitting window 8d, which makes it possible to improve the brightness of display in the transparent mode without sacrificing the brightness of display in the reflection mode.

Also, in this exemplary embodiment, because the light-reflecting film 8a has a film thickness less than the height of the frame-shaped convex portion 7b, when viewed from the light-guiding reflection surface 8e of the light-reflecting film 8a, a portion opposing the light-guiding reflection surface 8e through the light-transmitting window 8d can be positioned lower. It is thus possible to efficiently guide the light reflected on the light-guiding reflection surface 8e to the reflection surface 8f on the surface side of the light-reflecting film 8a.

Also, in this exemplary embodiment, a plurality of light-transmitting windows 58d are formed in the light-reflecting film 8a. Hence, under a condition that the area of the light-transmitting window 8d is same, then the light-guiding reflection surfaces 8e can be formed extensively in this exemplary embodiment in comparison with a case where a single large light-transmitting window 8d is formed, and as a consequence, a light utilization factor in the transparent mode can be enhanced.

Further, in this exemplary embodiment, because the frame-shaped protrusion 13b and the lower layer light-transmitting film 13a are formed with rounded top surface portions, a light scattering property on the surface of the light-reflecting film 8a can be enhanced. Meanwhile, a portion functioning as the light-guiding reflection surface 8e on the back surface of the light-reflecting film 8a, and the surface portion (reflection surface 8f) of the light-reflecting film to which light is guided from the light-guiding reflection surface 8e need to shape slopes. By giving roundness to the top surface of the frame-shaped protrusion 13b, the area of a flat portion that cannot be utilized as the light-guiding reflection surface 8e can be diminished on the back and front surfaces of the light-reflecting film 8a formed on the surface side of the frame-shaped protrusion 13b, which makes it possible to broaden the portion functioning as the light-guiding reflection surface 8e on the back surface of the light-reflecting film and the surface portion (reflection surface 8f) of the light-reflecting film to which light is guided from the light-guiding reflection surface 8e. As a result, a light utilization factor in the transparent mode can be enhanced.

(Fabrication Method of TFT)

Of the entire fabrication sequence of the electro-optic apparatus 100 arranged in this manner, a fabrication sequence of the TFT array substrate 10 will now be explained with reference to FIGS. 7(A)–7(D) and FIGS. 8(E)–8(H). FIGS. 7(A)–7(D) and FIGS. 8(E)–8(H) are both cross-sectional views detailing the processes after the pixel-switching TFT 30 is formed in the fabrication sequence of the TFT array substrate 10 of this exemplary embodiment, and each shows the cross-section taken along plane A-A' of FIG. 4.

In this exemplary embodiment, as shown in FIG. 7(A), the underlying protection film 11 is formed first on the substrate 10' made of glass or the like, and then the TFT 30 described with reference to FIG. 4 and FIG. 5 is formed using the insular semiconductor film 1a formed on the surface of the underlying protection film 11.

Then, as shown in FIG. 7(B), the photosensitive resin 13 is applied on the data line 6a and the drain electrode 6b on the surface side using the spin coating method or the like followed by exposure and development processes, whereby, as shown in FIG. 7(C), the photosensitive resin 13 is left selectively in regions corresponding to the convex portions 8b of the concavo-convex pattern 8g as the lower layer light-transmitting film 13a. In this instance, the frame-shaped protrusion 13b is also formed.

Then, heat treatment is performed to melt the photosensitive resin 13 forming the lower layer light-transmitting film 13a and the frame-shaped protrusion 13b, whereby, as shown in FIG. 7(D), the top surfaces of the lower layer light-transmitting films 13a and the frame-shaped protrusion 13b are rounded. Because the lower layer light-transmitting film 13a is also left in the region where the TFT 30 has been formed, a contact hole used to electrically connect the pixel electrode 9a to the drain electrode 6b is made in the lower layer light-transmitting film 13a.

Then, as shown in FIG. 8(E), the photosensitive resin 7 is applied on the lower layer light-transmitting film 13a and the frame-shaped protrusion 13b on the main surface side using the spin coating method or the like followed by exposure and development processes, whereby, as shown in FIG. 8(F), the upper layer light-transmitting film 7a is formed. As a result, not only concave portions and convex portions corresponding to the absence and the presence of the lower layer light-transmitting film 13a, but also the frame-shaped convex portion 7b corresponding to the frame-shaped protrusion 13b is formed on the surface of the upper layer light-transmitting film 7a. In this instance, a contact hole used to electrically connect the pixel electrode 9a to the drain electrode 6b is made in the upper layer light-transmitting film 7a.

Then, after a film of metal, such as aluminum, is formed on the surface of the upper layer light-transmitting film 7a, the metal film is patterned through the use of the photolithographic technique, whereby, as shown in FIG. 8(G), the light-reflecting film 8a is formed. In this instance, the light-transmitting window 8d is formed in the light-reflecting film 8a. With the light-reflecting film 8a formed in this manner, because the surface shape of the lower layer light-transmitting film 13a is reflected via the upper layer light-transmitting film 7a, the edgeless and smooth concavo-convex pattern 8a is formed on the surface of the light-reflecting film 8a.

Also, as was explained with reference to FIGS. 6(A) and 6(B), when the light-reflecting film 8a is formed, the light-guiding reflection surface 8e is formed by forming the light-transmitting film 8a to cover the frame-shaped convex portion 7b from the foot portion to the top portion on the side opposite to the side where the light-transmitting window 8d is formed in the region corresponding to the two sides 81d and 82d of the light-transmitting window 8d, whereas the reflection surface 8f which reflects light reflected on the light-guiding reflection surface 8e toward the counter substrate 20 is formed by covering the frame-shaped convex portion 7b with the light-reflecting film 8a from the foot portion to the top portion on the side where the light-transmitting window 8d is formed in the region corresponding to the other two sides 83d and 84d of the light-transmitting window 8d.

Then, after an ITO film having a thickness of 40 nm to 200 nm is formed on the light-reflecting film 8a on the surface side through the sputtering method or the like, the pixel electrode 9a is formed as shown in FIG. 8(H) by etching away the ITO film through the use of the photolithography technique.

Subsequently, as shown in FIG. 5, a polyimide film (alignment layer 12) is formed on the pixel electrode 9a on the surface side. More specifically, polyimide varnish, which is prepared by dissolving 5 to 10 wt % of polyimide or polyamide acid in a solvent, such as butylcellusolve and n-methylpyrrolidone, is subjected to flexographic printing followed by heating and curing (annealing). Then, the substrate on which is formed the polyimide film is rubbed in one specific direction with a puff cloth made of rayon fibers, so that the polyimide molecules are aligned in one specific direction in the vicinity of the surface. As a result, crystal liquid molecules filled in later are aligned in one specific direction through interplay between the liquid crystal molecules and the polyimide molecules.

(Other Exemplary Embodiments)

The above exemplary embodiment describes a case where the TFT is used as a pixel-switching active element. However, the same applies to a case where a thin-film diode element (TFD element), such as MIM (Metal Insulator Metal) element, is used as active element.

(Application of Electro-Optic Apparatus to Electronic Equipment)

The semi-transparent reflective electro-optic apparatus 100 arranged in this manner can be used as a display portion for various kinds of electronic equipment, examples of which are explained below with reference to FIG. 9 and FIGS. 10(A)–10(B).

FIG. 9 is a schematic showing a circuit arrangement of electronic equipment using the electro-optic apparatus according to the invention as a display apparatus.

Referring to FIG. 9, the electronic equipment includes a display information output source 70, a display information processing circuit 71, a power circuit 72, a timing generator 73, and a liquid crystal apparatus 74. The liquid crystal apparatus 74 includes a liquid crystal display panel 75 and a driving circuit 76. The aforementioned electro-optic apparatus 100 can be used as the liquid crystal apparatus 74.

The display information output source 70 is provided with a storage unit such as a memory including a ROM (Read Only Memory) and a RAM (Random Access Memory), and various kinds of discs, as well as a tuning circuit for tuning and outputting a digital image signal, etc., and it supplies the display information processing circuit 71 with display information, such as an image signal of a predetermined format, based on various clock signals generated by the timing generator 73.

The display information processing circuit 71 is provided with various related art or known circuits including a serial-to-parallel converting circuit, an amplification and inverting circuit, a rotation circuit, a gamma correction circuit, a clamp circuit, etc. It processes input display information and supplies the driving circuit 76 with the resulting image signal together with a clock signal CLK. The power circuit 72 supplies the respective components with a predetermined voltage.

FIGS. 10(A) and 10(B) are a schematic explaining a mobile personal computer, and a schematic explaining a cellular phone, respectively, each being an exemplary embodiment of electronic equipment according to the invention.

Of the two types of electronic equipment, a personal computer 80 shown in FIG. 10(A) includes a main body portion 82 provided with a keyboard 81, and a liquid crystal display unit 83. The liquid crystal display unit 83 includes the aforementioned electro-optic apparatus 100 as a component. Also, a cellular phone 90 shown in FIG. 10(B) includes a plurality of manipulation buttons 91 and a display portion composed of the aforementioned electro-optic apparatus 100.

[Advantage of the Invention]

As described above, with a semi-transparent reflective electro-optic apparatus to which the invention is applied, display in the reflection mode is possible because the light-reflecting film is formed, and display in the transparent mode is also possible because the light-transmitting window is formed in the light-reflecting film. The back surface of the light-reflecting film includes the light-guiding reflection surface that reflects and guides light incident from the back surface side of the light-transmitting substrate to the surface of the light-reflecting film opposing the light-guiding reflection surface with the light-transmitting window in between. Hence, of the light incident from the back surface side of the light-transmitting substrate, light that is shielded in the related art by the light-reflecting film and does not contribute to display in the transparent mode is partly reflected on the light-guiding reflection surface and guided to the surface of the light-reflecting film, and thereby contributes to display in the invention. For this reason, a quantity of display light in the transparent mode can be increased without enlarging the area of the light-transmitting window. It is thus possible to enhance the brightness of display in the transparent mode without sacrificing the brightness of display in the reflection mode.

What is claimed is:

1. A semi-transparent reflective electro-optic apparatus, comprising:
    an electro-optic material;
    a light-transmitting substrate retaining the electro-optic material;
    a light-transmitting concave and convex forming film defining specific concave portions and convex portions; and
    a light-reflecting film formed over the concave and convex forming film, the light-reflecting film defining a light-transmitting window, a back surface of the light-reflecting film including, in a partial region of a periphery of the light-transmitting window, a light-guiding reflection surface that opposes a surface of the light-reflecting film in a region opposing the partial region with the light-transmitting window in between, so that part of light incident from a back surface side of the light-transmitting substrate is reflected on the light-guiding reflection surface and guided to a surface side of the light-transmitting substrate.

2. The semi-transparent reflective electro-optic apparatus according to claim 1, the concave and convex forming film being composed of a lower layer light-transmitting film formed into a specific layout pattern, and an upper layer light-transmitting film formed on an upper layer side of the lower layer light-transmitting film.

3. The semi-transparent reflective electro-optic apparatus according to claim 2, further including:
    a frame-shaped protrusion, forming a frame-shaped convex portion along an outer rim of the light-transmitting window with respect to a surface of the concave and convex forming film, formed on a lower layer side of the light-reflecting film;
    the light-guiding reflection surface being formed of a back surface of the light-reflecting film covering the frame-shaped convex portion from a foot portion to a top portion on a side opposite to a side where the light-transmitting window is formed; and
    a surface of the light-reflecting film opposing the light-guiding reflection surface and forming a reflection surface to which light reflected on the light-guiding reflection surface is guided, by covering the frame-shaped convex portion with the light-reflecting film from a foot portion to a top portion on a side where the light-transmitting window is formed, at a portion opposing the light-guiding reflection surface with the light-transmitting window in between.

4. The semi-transparent reflective electro-optic apparatus according to claim 3, the reflection surface for light reflected on the light-guiding reflection surface opposing the light-guiding reflection surface as a parallel or nearly parallel plane.

5. The semi-transparent reflective electro-optic apparatus according to claim 3, the frame-shaped protrusion being composed of a light-transmitting film formed in a same layer as the lower layer light-transmitting film.

6. The semi-transparent reflective electro-optic apparatus according to claim 5, the frame-shaped protrusion and the lower layer light-transmitting film being formed with rounded top surface portions.

7. The semi-transparent reflective electro-optic apparatus according to claim 3, the light-reflecting film having a film thickness less than a height of the frame-shaped convex portion.

8. The semi-transparent reflective electro-optic apparatus according to claim 1, the light-reflecting film being provided with more than one light-transmitting window.

9. The semi-transparent reflective electro-optic apparatus according to claim 1, a planar shape of the light-transmitting window being a polygonal having a side parallel or nearly parallel to a side on which the light-guiding reflection surface is formed.

10. The semi-transparent reflective electro-optic apparatus according to claim 1, the electro-optic material being liquid crystal.

11. An electronic equipment, comprising:
the semi-transparent reflective electro-optic apparatus according to claim 1 usable as a display apparatus.

* * * * *